(12) United States Patent
Kang

(10) Patent No.: US 8,971,716 B2
(45) Date of Patent: Mar. 3, 2015

(54) OLED DISPLAY FOR VISIBLE RAY COMMUNICATION

(71) Applicant: Idro Co., Ltd., Gyeonggi-do (KR)

(72) Inventor: Yanggi Kang, Gyeonggi-do (KR)

(73) Assignee: Idro Co., Ltd., Gyeonggi-Do (KR)

( * ) Notice: Subject to any disclaimer, the term of this patent is extended or adjusted under 35 U.S.C. 154(b) by 4 days.

(21) Appl. No.: 13/935,482

(22) Filed: Jul. 4, 2013

(65) Prior Publication Data

US 2014/0010549 A1    Jan. 9, 2014

(30) Foreign Application Priority Data

Jul. 6, 2012  (KR) .......................... 10-2012-0073641

(51) Int. Cl.
*H04B 10/00* (2013.01)
*H04B 10/116* (2013.01)

(52) U.S. Cl.
CPC .................................. *H04B 10/116* (2013.01)
USPC ........... 398/118; 398/130; 398/131; 398/128; 398/172

(58) Field of Classification Search
CPC .............................. H04B 10/116; H04B 10/11
USPC .................................. 398/118, 172, 128–131
See application file for complete search history.

(56) References Cited

U.S. PATENT DOCUMENTS

| | | | | |
|---|---|---|---|---|
| 8,295,705 | B2* | 10/2012 | Kim et al. | 398/103 |
| 8,565,607 | B2* | 10/2013 | Kang et al. | 398/128 |
| 8,699,887 | B1* | 4/2014 | Rothenberg | 398/172 |
| 2005/0093466 | A1* | 5/2005 | Matsumoto | 315/169.3 |
| 2010/0322635 | A1* | 12/2010 | Klinghult | 398/132 |
| 2011/0080441 | A1* | 4/2011 | Wacyk et al. | 345/691 |
| 2011/0080442 | A1* | 4/2011 | Ghosh et al. | 345/694 |
| 2012/0068972 | A1* | 3/2012 | Tsang et al. | 345/175 |
| 2012/0163826 | A1* | 6/2012 | Schenk et al. | 398/91 |
| 2012/0262487 | A1* | 10/2012 | Huebner | 345/634 |
| 2013/0127790 | A1* | 5/2013 | Wassvik | 345/175 |
| 2013/0135244 | A1* | 5/2013 | Lynch et al. | 345/174 |
| 2013/0194199 | A1* | 8/2013 | Lynch et al. | 345/173 |

* cited by examiner

*Primary Examiner* — Daniel Washburn
*Assistant Examiner* — Hibret Woldekidan
(74) *Attorney, Agent, or Firm* — Jianq Chyun IP Office

(57) ABSTRACT

Provided is an organic light emitting diode (OLED) display device for visible ray communication, including: a substrate; a plurality of OLED pixels that are formed on the substrate and generate a red (R), green (G), or blue (B) visible ray; and a plurality of light receiving units that are formed on the substrate to sense a visible ray signal and convert the visible ray signal to an electrical signal.

7 Claims, 1 Drawing Sheet

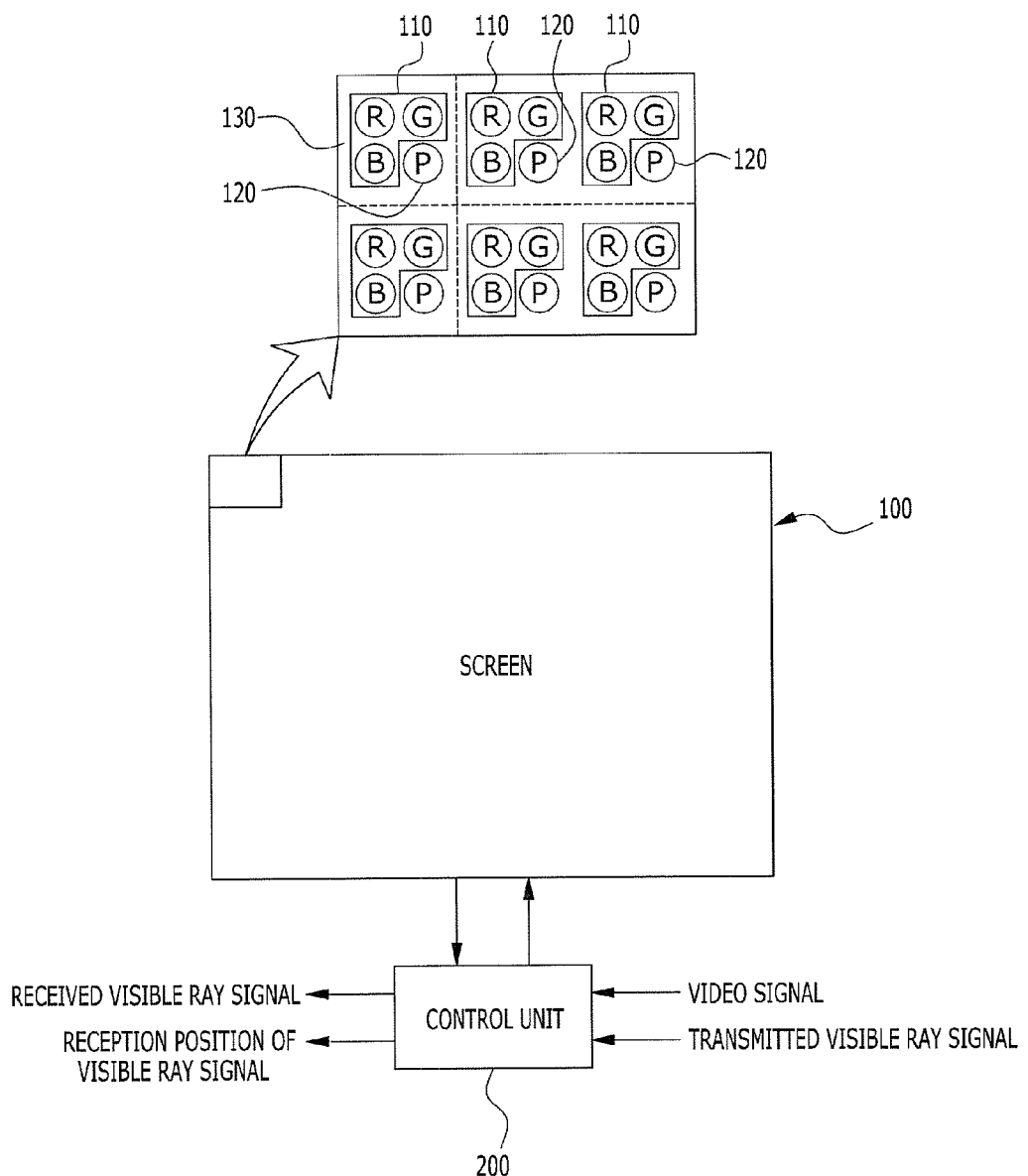

OLED DISPLAY FOR VISIBLE RAY COMMUNICATION

CROSS-REFERENCE TO RELATED PATENT APPLICATION

This application claims the priority benefit of Korean Patent Application No. 10-2012-0073641, filed on Jul. 6, 2012, in the Korean Intellectual Property Office, the disclosure of which is incorporated herein in its entirety by reference.

BACKGROUND OF THE INVENTION

1. Field of the Invention

The present invention relates to an organic light emitting diode (OLED) display device for visible ray communication, and more particularly, to an OLED display device for visible ray communication, whereby a visible ray signal is transmitted from the OLED display device, and another visible ray signal is received at the same time via a screen of the OLED display device, thereby enabling two-way wireless communication by using a visible ray signal.

2. Description of the Related Art

A visible ray communication method using a visible ray has several advantages over the conventional wireless communication method. A visible ray is transmitted or received only within a range that light reaches and is not transmitted through walls or doors, and thus, radio wave pollution is reduced. Accordingly, there is no need for additional radio-frequency authentication in the process of development of a visible ray communication device, making the development procedure thereof relatively easy. In addition, visible rays generated in a visible ray transmission/reception device may be used as an indoor illumination.

However, there are several problems in applying the visible ray communication method to an image display device.

Currently, a liquid crystal display (LCD) is widely used as a display device of, for example, a computer, a tablet computer, a TV, or a mobile device. A LCD uses a fluorescent lamp or a light emitting diode (LED) device as a backlight unit (BLU), and is configured such that visible rays generated in a light source as described above pass through a liquid crystal panel to be displayed in various colors and to be turned on and off. When a fluorescent lamp is used as a BLU in the LCD, light generated in a light source is not immediately turned on or off but the light is seen as being turned on or off via an operation of the liquid crystal panel while the light source is continuously in a switched-on state. Thus, the LCD using fluorescent lamp as a BLU is not appropriate as a device for transmitting a visible ray signal. Since an operating speed of a liquid crystal panel is limited, it is difficult to transmit a large amount of data by using a visible ray signal. When a LED is used as a BLU, visible ray communication may be performed by turning on or off the LED of the BLU; however, as the number of LED devices is relatively small compared to the number of pixels, it is difficult to control, for example, an area where the visible ray communication is conducted.

SUMMARY OF THE INVENTION

The present invention provides an organic light emitting diode (OLED) display device for visible ray communication, that is used as an image display device and that transmits and receives visible ray signals at the same time to thereby enable visible ray communication.

According to an aspect of the present invention, there is provided an organic light emitting diode (OLED) display device for visible ray communication, comprising: a substrate; a plurality of OLED pixels that are formed on the substrate and generate a red (R), green (G), or blue (B) visible ray; and a plurality of light receiving units that are formed on the substrate to sense a visible ray signal and convert the visible ray signal to an electrical signal.

BRIEF DESCRIPTION OF THE DRAWINGS

The above and other features and advantages of the present invention will become more apparent by describing in detail exemplary embodiments thereof with reference to the attached drawing in which:

FIG. 1 is a schematic view illustrating an organic light emitting diode (OLED) display device for visible ray communication according to an embodiment of the present invention.

DETAILED DESCRIPTION OF THE INVENTION

Hereinafter, an organic light emitting diode (OLED) display device for visible ray communication according to an embodiment of the present invention will be described in detail with reference to the attached drawing.

FIG. 1 is a schematic view illustrating an organic light emitting diode (OLED) display device for visible ray communication according to an embodiment of the present invention.

Referring to FIG. 1, the OLED display device for visible ray communication is formed of a substrate, a plurality of OLED pixels, a plurality of light receiving units, and a control unit.

Referring to FIG. 1, the OLED display device for visible communication includes a substrate 130, a plurality of OLED pixels 110, a plurality of light receiving units 120, and a control unit 200.

The substrate 130 is a base on which a device is formed using semiconductor processes. The OLED pixels 110 and the light receiving units 120 are formed on the substrate 130 formed of silicon or sapphire by performing semiconductor processes such as deposition, etching, a chemical vapor deposition (CVD) process, or photo-lithography.

According to a typical OLED display according to the conventional art, a plurality of OLED pixels are formed on a substrate, and each of the OLED pixels is configured to generate a red, green, or blue visible ray. The OLED display generates red, green or blue light regardless of whether it is an active matrix OLED or a passive matrix OLED.

As described above, the OLED display device according to the current embodiment of the present invention is manufactured by also forming the light receiving units 120 (e.g., photo-diodes) on the substrate 130, on which the OLED pixels 110 are formed. The light receiving units 120 sense a visible ray signal having a wavelength in a range from 360 nm to 760 nm and convert the same to an electrical signal. The visible ray signal converted to the electrical signal by using the light receiving units 120 is transmitted to the control unit 200.

The light receiving units 120 may be formed only in a predetermined portion of an OLED display screen 100 or over the entire screen 100 at predetermined intervals. That is, the light receiving units 120 may be formed in a smaller number than the OLED pixels 110 such that the light receiving units 120 are formed on the substrate 130 for every predetermined number of OLED pixels 110. Here, an embodiment of the present invention will be described, in which, as illustrated in FIG. 1, the light receiving units 120 are formed in the same number as the OLED pixels 110 such that the light receiving units 120 and the OLED pixels 110 are in one-to-one correspondence and each of the light receiving units 120 is arranged in an area of a corresponding one of the OLED pixels 110.

The control unit 200 controls each of the OLED pixels 110. That is, the control unit 200 receives an video signal like a monitor of a computer or a TV screen so as to control each of the OLED pixels 110 and display an image on the screen 100.

In addition, at the same time as controlling each of the OLED pixels 110 and displaying an image on the screen 100, the control unit 200 of the OLED display device for visible ray communication according to the current embodiment of the present invention also transmits a visible ray signal by turning on or off the OLED pixels 110. By quickly turning on or off the OLED pixels 110 at predetermined time intervals which human eyes cannot perceive, a visible ray signal may be simultaneously transmitted through the display screen 100 without affecting the user's perception of the image displayed on the screen 100. According to necessity, whether a visible ray signal is transmitted or not may be displayed on the screen 100 by turning on or off the screen 100 so that the user may know.

The control unit 200 may control a visible ray signal to be transmitted from all of the OLED pixels 110 of the display screen 100 or only from some of the OLED pixels 110. The control unit 200 may control a visible ray signal to be transmitted through the entire display screen 100 or to be transmitted through only a portion of the display screen 100, through the OLED pixels 110 included in the corresponding portion. The control unit 200 may divide the display screen 100 into a plurality of areas and control the OLED pixels 110 such that different visible ray signals are transmitted from the respective areas above.

As described above, the control unit 200 receives a visible ray signal received by using each of the light receiving units 120 and transmits the visible ray signal to an external device. The control unit 200 may also detect a position of the light receiving units 120 that have received the visible ray signal, on the screen 100, and may transmit the position to the external device. The control unit 200 may detect the position of the light receiving units 120 on the screen 100 by using various methods. For example, positions of the light receiving units 120 on the screen 100 may be stored in the control unit 200 in advance, and when a visible ray signal is received by the light receiving units 120, a position of the light receiving unit 120 that has received the visible ray signal may be inquired and transmitted to the external device. According to circumstances, when a visible ray signal received by the light receiving units 120 is transmitted to the control unit 200, an identification number of the light receiving units 120 may also be transmitted to the control unit 200, and the control unit 200 may detect the position of the light receiving units 120 by inquiring coordinates corresponding to the identification number of each of the light receiving units 120 stored in the control unit 200 in advance.

The OLED display device for visible ray communication of the current embodiment of the present invention may be used as a typical screen display device and also as a transmitting/receiving unit for a visible ray signal at the same time, without the need to install an additional device for transmitting or receiving a visible ray signal. In other words, the OLED display device operates also as an interface for visible ray communication.

By using a function of transmitting a visible ray signal, of the OLED display device for visible ray communication according to the current embodiment of the present invention, data files or music or images stored in a computer or a mobile device may be transmitted to the outside via the display screen 100. For example, while displaying an image of a movie via the display screen 100, audio data of the movie may be transmitted via the display screen 100 at the same time. In this case, a separate visible ray signal receiving unit may receive the audio data and output the same through a speaker so as to reproduce sound of the movie. As described above, by using the visible ray signal-transmitting function of the OLED display for visible ray communication according to the current embodiment of the present invention, a sound signal may be reproduced through a speaker via wireless communication without having to connect a speaker directly to a computer main body, a mobile terminal or a TV via wires.

In the case of a LCD which uses a fluorescent lamp or a LED lighting as a backlight unit (BLU), a visible ray signal may be transmitted by turning on or off a visible ray by controlling a liquid crystal panel. A liquid crystal panel has a remarkably lower operating speed than the OLED pixels 110, and thus is not appropriate to transmit a visible ray signal. However, on the other hand, the OLED pixels 110 do not use a BLU but red, green, or blue light is immediately generated in the OLED pixels 110. Also, as the OLED pixels 110 may operate at a significantly higher speed than a liquid crystal panel, the OLED pixels 110 may function as an image display device and effectively perform the function of transmitting a visible ray signal at the same time.

A function of receiving a visible ray signal may be performed by using the light receiving units 120 formed on the substrate 130. In detail, data may be received from the outside by using the light receiving units 120 of the screen 100 without using an input device or a memory device such as a universal serial bus (USB) memory.

In addition, as described above, by allowing the control unit 200 to detect positions of the light receiving units 120 that have received a visible ray signal, on the screen 100, the OLED display device according to the current embodiment of the present invention may be applied in various fields.

For example, functions of a laser pointer and a mouse may be performed at the same time by transmitting a visible ray signal to the display screen 100 by using a visible ray that is generated in a laser diode (LD) or the like and has excellent linearity. By indicating a predetermined portion of the screen 100 by irradiating a visible ray generated in a LD, onto the screen 100, and transmitting a visible ray signal in this state, a cursor may be displayed at a position to which the visible ray of the LD is irradiated on the display screen 100 just in the same manner as a cursor of a mouse is displayed and moved on the screen 100. As described above, by detecting a position of the light receiving units 120, which have received a visible ray signal, on the screen 100, and transmitting the position to an operating system (O/S) or a user interface (UI), by using the control unit 200, a cursor may be displayed at a position on the screen 100 to which the visible ray of the LD is irradiated. In addition, when the LD transmits another visible ray signal while the cursor is being displayed, functions such as a click, a drag, or a drop of a mouse may also be performed similarly. When a LD visible ray signal as described above is applied to an OLED display device for visible ray communication according to the current embodiment of the present invention, a smart TV including a remote controller having various functions may be implemented. A user may not only change channels and adjust volume by irradiating a visible ray signal onto a TV screen 100 but may also perform other various acts such as making a purchase order of a product displayed on the screen 100.

In addition, an input device similar to a stylus that inputs information to a touch screen may also be implemented by using the OLED display device according to the embodiments of the present invention. A stylus including a lamp installed at an end portion of a stick to generate a visible ray signal may be used as an input device by moving the stylus along the screen 100 of the OLED display device while maintaining the stylus in contact with the screen 100. That is, just like a pen, when a user moves the stylus along the screen 100, the control unit 200 may detect a track of the stylus and receive a visible ray signal at the same time.

Also, in addition to the above-described examples, a terminal having various functions for playing a game may be implemented by using the OLED display device for visible ray communication according to the embodiments of the present invention.

Meanwhile, in order to prevent interference between a visible ray or a visible ray signal that are generated in the OLED pixels 110 and a visible ray signal transmitted from the outside to the light receiving units 120, a wavelength band of the visible ray signal transmitted from the OLED pixels 110 and a wavelength band of the visible ray signal received by the light receiving units 120 may be set differently.

According to the OLED display device for visible ray communication of the embodiments of the present invention, a display device formed of OLED pixels is used as a display device that displays an image on a screen like a typical image display device, and at the same time, the display device transmits or receives a visible ray signal at a high speed via the screen to thereby enable visible ray communication.

While the present invention has been particularly shown and described with reference to exemplary embodiments thereof, the scope of the invention is not limited the above-described or above-illustrated embodiments.

For example, while the OLED display device for visible ray communication of the embodiments of the present invention is described as including the control unit 200 that controls to transmit a visible ray signal to be output, to the OLED pixels 110 and receives a visible ray signal received by the light receiving units 120, an OLED display device for visible ray communication may also be configured without the control unit 200. When an OLED display device for visible ray communication not including the control unit 200 is produced, manufactured, or distributed, the OLED display device may be connected to an external device including the control unit 200 for use.

In addition, while the control unit 200 detecting a position of the light receiving units 120 that have received a visible ray signal and transmitting the position to an external device is described, alternatively, the control unit 200 may only receive a visible ray signal via the light receiving units 120 and may not detect a position on the screen 100 at which the visible ray signal is received.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An organic light emitting diode (OLED) display device for visible ray communication, comprising:
   a substrate;
   a plurality of OLED pixels that are formed on the substrate and generate a red (R), green (G), or blue (B) visible ray;
   a plurality of light receiving units that are formed on the substrate to sense a visible ray signal and convert the visible ray signal to an electrical signal; and
   a control unit that controls the plurality of OLED pixels to display an image on a screen formed of the plurality of OLED pixels and receives a visible ray signal that is received by the plurality of light receiving units, wherein together when receiving the visible ray signal, the control unit detects a position of each of the light receiving units on a screen at which the visible ray signal is received, coordinates of the light receiving units on the screen corresponding to identification numbers of the light receiving units are stored in the control unit in advance, and the light receiving units transmit the identification numbers to the control unit, together with the received visible ray signal.

2. The OLED display device of claim 1, wherein coordinates of the light receiving units on the screen are stored in the control unit in one-to-one correspondence.

3. The OLED display device of claim 1, wherein the control unit transmits, by controlling the OLED pixels, a visible ray signal at the same time as displaying an image, which is visually recognizable by humans, on the screen.

4. The OLED display device of claim 1, wherein the OLED pixels and the light receiving units are included in the same number so as to correspond to each other, and each of the light receiving units is disposed inside an area of a corresponding OLED pixel.

5. The OLED display device of claim 1, wherein the light receiving units are included in a smaller number than the OLED pixels, and each of the light receiving units is arranged for every predetermined number of the OLED pixels.

6. The OLED display device of claim 1, wherein the light receiving units are arranged only in a portion of the substrate.

7. The OLED display device of claim 1, wherein a wavelength band of a visible ray signal transmitted from the OLED pixels and a wavelength band of a visible ray signal received by the light receiving units are different from each other.

* * * * *